United States Patent [19]

Akkapeddi et al.

[11] 4,398,018
[45] Aug. 9, 1983

[54] TEMPERATURE STABLE THERMOTROPIC POLY(ESTER CARBONATE) DERIVED FROM T-BUTYLHYDROQUINONE

[75] Inventors: Murali K. Akkapeddi, Morris Plains; Bruce T. DeBona, Madison; Yu-Chin Lai; Dusan C. Prevorsek, both of Morristown, all of N.J.

[73] Assignee: Allied Corporation, Morris Township, Morris County, N.J.

[21] Appl. No.: 333,228

[22] Filed: Dec. 21, 1981

[51] Int. Cl.$^3$ ............................................ C08G 63/64
[52] U.S. Cl. .................................. 528/176; 528/179; 528/180; 528/181; 528/191; 528/193; 528/194
[58] Field of Search ............... 528/191, 193, 176, 179, 528/180, 181, 194

[56] References Cited

U.S. PATENT DOCUMENTS

| | | | |
|---|---|---|---|
| 4,107,143 | 8/1978 | Inata et al. | 528/176 |
| 4,238,600 | 12/1980 | Jackson, Jr. et al. | 528/193 |
| 4,284,757 | 8/1981 | Fayolle | 528/191 |

*Primary Examiner*—Lester L. Lee
*Attorney, Agent, or Firm*—Alan M. Doernberg; Gerhard H. Fuchs

[57] ABSTRACT

A thermotropic poly(ester carbonate) containing diacyl moieties such as terephthalate and carbonate moieties as well as dihydroxy-derived moieties is useful for forming fibers or films. The dihydroxy-derived moieties are at least 40% derived from t-butylhydroquinone, with hydroquinone and methylhydroquinone being exemplary second components. The polymers can be prepared by melt, solution or interfacial polymerization, are liquid crystalline in the melt and have glass transition temperatures above 100° C.

7 Claims, No Drawings

TEMPERATURE STABLE THERMOTROPIC POLY(ESTER CARBONATE) DERIVED FROM T-BUTYLHYDROQUINONE

BACKGROUND OF THE INVENTION

Polymers are known exhibiting liquid crystalline behavior either in solution or in the melt which contribute to desirable properties when formed into either highly ordered fibers or other fabricated structures. The most commonly used class are the aromatic polyamides, typified by poly(p-benzamide), which exhibit liquid crystalline behavior in certain solutions or dopes, and are thus known as lyotropic polymers. An exemplary disclosure of such polymers is U.S. Pat. No. 3,671,542 to Kwolek (June 20, 1972). These polymers are relatively easy to form, but are difficult to handle and must be cast into derived forms (fibers and films) from solution.

Certain aromatic polyesters are known which are liquid crystalline in the melt and are thus thermotropic. U.S. Pat. Nos. 4,140,846 to Jackson, Jr. et al. (Feb. 20, 1979), 3,890,256 to McFarlane et al. (June 17, 1975), 3,991,013 to Pletcher (Nov. 9, 1976), 4,066,620 to Kleinschuster et al (Jan. 3, 1978), 4,075,262 to Schaefgen (Feb. 21, 1978), 4,118,372 to Schaefgen (Oct. 3, 1978); 4,156,070 to Jackson, Jr. et al (May 22, 1979) and 4,159,365 to Payet (June 26, 1979) are representative of such thermotropic polyesters. Known polymers of this class must be formed by melt polymerization, and these polymers have not found wide use. These polyesters exhibit little, if any, solubility in most solvents.

One such thermotropic polyester is phenylhydroquinone terephthalate, as described in U.S. Pat. No. 4,159,365 to Payet. While this material has good low temperature properties, the phenylhydroquinone monomer is difficult to prepare and expensive. Furthermore, all of the known thermotropic polyesters lose their good properties at their glass transition temperature which also does not generally exceed 100° C.

Poly(ester carbonates) are a known class of polymers useful in a variety of articles where high performance is desirable. Such polymers are not, however, generally formed into fibers and are not known to exhibit the properties of the aromatic polyamides or other liquid crystalline material of either the lyotropic or thermotropic type. Such poly(ester carbonates) conventionally include as the principle dihydric aromatic alcohol a bisphenol such as bisphenol-A which would be regarded in a nomenclature of B. P. Griffin et al., British Polymer J. 147 (1980) as a non-linear monomer and include carbonate moieties which are highly flexible. Thermotropic poly(ester carbonates) are described in European Published Patent Application No. 0015856 (Sept. 17, 1980) to Rhone-Poulenc Industries containing methylhydroquinone as the preferred diol (optionally replaced up to 30% by hydroquinone) and various proportions of terephthalate and carbonate. While the monomers forming the terephthalate and carbonate moieties are readily available, methylhydroquinone (or its alternates, the chloro, bromo or ethyl compounds) are generally quite expensive. Furthermore, these poly(ester carbonates) have low glass transition temperatures and thus lose good mechanical properties on heating to 100° C.

BRIEF DESCRIPTION OF THE INVENTION

A class of poly(ester carbonates) has been found which can be formed by solution or interfacial techniques, and can also be formed by melt condensation, and which furthermore are thermotropic and thus produce high strength fibers. Because of the combination of solubility and thermotropic behavior, such polymers can be prepared as a solution, cast or spun into fibers either from solution or from the melt and can be oriented or otherwise upgraded by drawing, annealing or other conventional techniques used to improve the orientation and crystallinity of fibers. Furthermore, the thermotropic poly(ester carbonates) of this invention have glass transition temperatures of at least about 100° C., preferably at least about 130° C., which enables them to retain mechanical properties on heating to these temperatures.

Thus the present invention includes a poly(ester carbonate) polymer having diacyl moieties which are primarily terephthaloyl moieties, aromatic dihydroxy moieties and carbonate moieties. In the polymers of the invention the aromatic dihydroxy moieties are primarily, e.g. at least 40 mol percent, t-butylbenzene-2,5-dioxy. The remaining substituted hydroquinone-derived moieties are substituted by alkyl of 1–6 carbons, alkoxy of 1–6 carbons, phenyl or halo. The poly(ester carbonates) of the present invention are liquid crystalline in the melt at least up to 20° C. above their melting point and have glass transition temperatures of at least 100° C.

The polymers of the present invention can be formed as low molecular weight oligomers or polymers of sufficient molecular weight to form fibers. Furthermore, the polymers can be formed interfacially or by solution processes, can be cast or spun into fibers or films either from solution or from the melt and can be drawn and/or annealed.

DETAILED DESCRIPTION OF THE INVENTION

The poly(ester carbonate) polymers of the present invention have diacyl moieties, aromatic dihydroxy moieties and carbonate moieties. The carbonate moieties may be formed by reacting phosgene or by exchange of carbonate or haloformate monomers with various oligomers as is conventional. The diacyl moities are primarily terephthaloyl and can be formed either from terephthalic acid or from terephthaloyl halide such as terephthaloyl chloride. Terephthalate diesters such as dimethyl terephthalate or diphenyl terephthalate (preferably the latter) may be used if the polymer is produced by melt condensation. Although the diacyl moiety should be primarily terephthaloyl, other diacyl moieties may be used as a relatively minor component, such as substituted terephthaloyl, isophthaloyl, 2,6-naphthalenedicarboxyl, 1,4-cyclohexanedicarboxyl and 1,3-cyclohexanedicarboxyl.

The aromatic dihydroxy moieties of the polymer of the invention should be primarily substituted hydroquinone. At least 40 mol percent of the aromatic dihydroxy moieties should be t-butylbenzene-2,5-dioxy as can be derived from t-butylhydroquinone monomer, with the remainder of the aromatic dihydroxy moieties also preferably being substituted benzenedioxy, as can be derived from other substituted hydroquinone moieties. The other substituted hydroquinone monomers may be monosubstituted, disubstituted, trisubstituted or tetrasubstituted. If more than one substituent is present, they may be the same or different. Preferred locations for substitution are either monosubstitution, 2,6-disubstitution or trisubstitution. Other disubstitutions are also permissible. Unsubstituted hydroquinone may also be present as a minor component of the aromatic dihydroxy moieties.

The substituents on the other substituted benzenedioxy hydroquinone may be alkyl of 1-6 carbons, alkoxy of 1-6 carbons, phenyl or halo. Of the alkyls, lower alkyls are preferred, and methyl is most preferred. Of the alkoxides, lower alkoxides are preferred and methoxy is most preferred. Of the halos, chloro, bromo and fluoro are preferred over iodo.

Examples of suitable substituted hydroquinones useful as secondary monomers in the present invention are methyl hydroquinone, 2,3-dimethyl hydroquinone, 2,5-dimethyl hydroquinone, 2,6-dimethyl hydroquinone, trimethyl hydroquinone, tetramethyl hydroquinone, methoxy hydroquinone, 2,6-dimethoxy hydroquinone, trimethoxy hydroquinone, chloro hydroquinone, 2,6-dichloro hydroquinone, trichloro hydroquinone, bromohydroquinone, 2,6-dibromohydroquinone, tribromohydroquinone, phenylhydroquinone, 2-methyl-6-phenylhydroquinone, propoxyhydroquinone, butylhydroquinone, hexylhydroquinone, fluorohydroquinone and cyclohexylhydroquinone. The predominent dihydroxy moiety is derived from t-butylhydroquinone monomer.

Aromatic dihydroxy moieties which are not substituted hydroquinone may be of a variety of conventional aromatic dihydroxy moieties as used in polycarbonates and poly(ester carbonates). Several bisphenols not commonly used in polyesters or polyester carbonates are preferred as the additional dihydric aromatic moieties of the present invention. One such class is the substituted 4,4'-dihydroxy biphenyls. Such dihydroxybiphenyls are preferably substituted in positions adjacent to the hydroxies and are most preferably 3,3',5,5'-tetrasubstituted-4,4'dihydroxy biphenyls. The substituents on the dihydroxybiphenyls may be any of the substituents indicated above for the substituted hydroquinones, but are preferably lower alkyl as methyl, lower alkoxy such as methoxy or halo such as chloro or bromo.

Other suitable classes of aromatic dihydroxy moieties to be used together with substituted hydroquinone are the dihydroxynaphthalenes, the dihydroxyanthracenes and the dihydroxyanthraquinones. Preferred in this group are 2,6-dihydroxynaphthalene, 2,6-dihydroxyanthraquinone and either of them substituted by alkyl of 1-6 carbons, alkoxy of 1-6 carbons, phenyl or halo. 1,5-dihydroxynaphthalene, being substituted benzenedioxy, as can be derived from other substituted hydroquinone moieties. The other substituted 1,4-dihydroxyanthraquinone and substituted forms thereof may also be used. Certain linked bisphenols such as 4,4'-dihydroxydiphenyl ether, 4,4'-dihydroxydiphenyl thioether, 4,4'-dihydroxydiphenyl sulfone and substituted forms thereof may also be used. Linked bisphenols with highly flexible linking groups such as isopropylidene (as in bisphenol A) are preferably not used to any significant degree.

Another class of suitable aromatic dihydroxy moieties useful in the present invention as the minor aromatic dihydroxy component are resorcinol and substituted resorcinols, with substituents as described above for substituted hydroquinones being preferred. Suitable resorcinols include 2-methylresorcinol, 3-methylresorcinol, 2-methoxyresorcinol, 3-methoxyresorcinol, 2,4-dimethylresorcinol, 2-chlororesorcinol, 2-bromoresorcinol, 2-propylresorcinol, 2-phenyl-recorcinol and 2,4-dichlororesorcinol.

Where the terephthalate moieties are not the sole diacyl moieties used in the polymer, other aromatic dicarboxylic acid moieties may be used. Examples of such moieties include substituted terephthalates such as methyl-, chloro-, lower alkoxy (one to six carbons) or bromoterephthalate; isophthalate; 2,5-pyridine dicarboxylate; and 2,6-naphthalene dicarboxylate. Substituted forms thereof may also be used as minor components. While the present polymers may have solely carbonate, dihydric aromatic alcohol and diacyl moieties, it is contemplated to include other moieties, including hydroxyaromatic carboxylates such as 4-hydroxy......... acid or substituted forms thereof in minor pro......tions. For example, a polymer of t-butylhydroquinone: terephthalate:carbonate (2:1:1) can be modified by using hydroxybenzoic acid as a fourth component, whereby the ratio becomes, for example, 1.9:0.9:1:0.1 or 1.8:0.8:1:0.2. Hydroxyaromatic carboxylates are used primarily when the polymer is formed by melt condensation, as described below, but may be used in small amounts in the general manner described in U.S. Pat. No. 4,105,633 to Swart et al (Aug. 8, 1978) in solution or interfacial methods. In the latter methods the hydroxyaromatic carboxylate is coupled with phosgene and the resultant diacid converted to a diacyl chloride and then reacted with other monomers including aromatic dihydroxy moities.

The polymers of the present invention may be formed by solution polymerization. Such techniques involve reacting acid halides, and especially acid chlorides, of the diacyl moieties, e.g. terephthaloyl chloride, and phosgene with the aromatic dihydroxy moieties, including t-butylhydroquinone alone or with or hydroquinones. The reaction is conducted in a solvent, e.g. a chlorinated aliphatic solvent such as dichloromethane, in the presence of a acid acceptor and solvent, e.g. pyridine, and a chain length regulator, e.g. t-butylphenol. The order of addition of reactants is generally not critical.

The poly(ester carbonates) of the present invention may also be formed by interfacial techniques of the type described in U.S. Pat. No. 4,255,556 of L. Segal et al. (Mar. 10, 1981) which describes such processes for polymers similar to those of U.S. Pat. No. 4,156,069 to Prevorsek et al. Care should be taken in the introduction of monomers to minimize the premature precipitation of oligomers in the organic solvent used for the polymerization. In such interfacial polymerizations the aromatic dihydroxy moieties are introduced as a salt in the aqueous phase, e.g. disodium t-butylhydroquinone.

The polymers of the present invention are preferably formed by melt condensation. In this method the diacyl moieties may be introduced as diesters such as diphenylterephthalate and the carbonate moieties as diesters such as diphenylcarbonate. The materials are mixed in the melt with the dihydroxy compound (including t-butylhydroquinone), and optionally a suitable organometal catalyst such as lithium phenolate, aluminum isopropoxide or sodium methylate, and optionally hydroxybenzoic acid or one of its esters and heated to transesterify and remove the alcohol part of the esters (e.g. phenol) by evaporation.

In a modified melt condensation process, terephthalic acid is used in place of terephthaloyl chloride and the amount of diphenyl carbonate is increased by the molar amount of terephthalic acid (e.g. doubled if the desired final terephthalate: carbonate ratio is 1:1). By heating to one temperature, e.g. 200° C., at which transesterification occurs, the terephthalic acid is converted in situ to diphenyl terephthalate by conversion of the additional diphenyl carbonate to carbon dioxide and water (both of which are vented). The temperature is then raised to a suitable reaction temperature, e.g. 270° C., at which polymerization occurs or is completed, liberating phenol.

Once the polymers are formed, they may be purified, if required, by conventional technology. Thereafter the polymers can be spun or extruded into fibers, sheets or other fabricated forms using conventional techniques, including post-treatments such as drawing, heat treatments and the like. The thermotropic nature of the polymers increases the orientation of the fabricated forms, which manifests itself in improved physical properties, e.g. higher tensile modulurs for fibers.

In determining liquid crystallinity, the TOT procedure described in cols. 8-10 of U.S. Pat. No. 4,118,372 may be used. The results reported in the following Example 6 are based on visual observations with such a test, and not on quantitative measurement of light intensity.

An important feature of the thermotropic poly(ester carbonate) polymers of the present invention is their retention of properties when heated to 100° C. or above. When formed into oriented fibers or films, the properties most notably retained at elevated temperatures are tenacity and tensile modulus.

EXAMPLE 1 t-Butylhydroquinone (83.1 g, 0.50 mol), diphenyl carbonate (53.6 g, 0.25 mol) and diphenyl terephthalate (79.6 g, 0.25 mol) were charged together with 0.216 g of tetrabutyl titanate to a resin kettle equipped with nitrogen gas inlet tube, distilling head, mechanical stirrer and thermometer. After heating to 100° C. under nitrogen for 90 minutes, the stirring was initiated. The temperature was then raised to 215° C. in another 90 minutes. At that temperature phenol started to distill out. The temperature continued to be raised while distilling; it reached 270° C. in 25 minutes and stayed there for 40 minutes. After that nitrogen flow was stopped and the system was brought to a vacuum of 7 mm Hg (0.93 kPa) in 5 minutes and kept at that pressure for 45 minutes; during that period the temperature rose to 310° C. The reaction was stopped and the molten polymeric material was then cooled down under nitrogen to room temperature and the solidified polymer broken up and ground in a mill to yield 114.6 g of fine powder. The polymer appeared to fuse starting about 265°-270° C. and completely melt at 310° C. The melt was birefringent and showed color bands upon shearing under the polarizer. The polymer was dissolved in 40/60 p-chlorophenol/1,2-dichloroethane and reprecipitated from methanol and then dried in vacuo at 110° C. for 48 hours. The final product had a reduced viscosity (0.5% in 50/50 p-chlorophenol/1,2-dichloroethane) of 0.58 dL/g and glass transition temperature of 119° C.

EXAMPLE 2 t-Butylhydroquinone (83.1 g, 0.50 mol), diphenyl carbonate (75.0 g, 0.35 mol) and diphenyl terephthalate (47.8 g, 0.15 mol) were charged together with 0.125 g of tetrabutyl titanate to a resin kettle equipped with a nitrogen inlet tube, distilling head, mechanical stirrer and thermometer. After heating to 90° C. under nitrogen for 35 minutes, the stirring was initiated and the system was brought to 210° C. in another 70 minutes. Phenol started to distill at this temperature. The temperature reached 243° C. in 15 minutes and stayed there for 10 minutes; during this period, over 90% of phenol was collected. The temperature was then raised to 285° C. in 60 minutes, then vacuum was applied (0.2-0.3 mm Hg or 27-40 Pa) and maintained there for 30 minutes. After that the temperature was raised to 300° C. in 40 minutes. The reaction was then stopped by flushing nitrogen into the system and cooling. When the temperature reached 250° C., the molten fibrous material was taken out of the kettle quickly and cooled down to room temperature under nitrogen flush, yield 107 g. The polymer showed birefringent behavior from 178° C. to 337° C. under shear using a polarizer. The polymer was dissolved in boiling toluene and reprecipitated from methanol. Purified polymer gave a reduced viscosity (0.5% in 50/50 p-chlorophenol/1,2-dichloroethane) of 0.80 dL/g and a glass transition temperature of 149° C.

EXAMPLE 3 t-Butylhydroquinone (83.1 g, 0.50 mol), diphenyl carbonate (64.3 g, 0.30 mol) and diphenyl terephthalate (63.7 g, 0.20 mol) were charged together with 0.215 g of tetrabutyl titanate to a resin kettle equipped with a nitrogen inlet tube, distilling head, mechanical stirrer and thermometer. After heating to 105° C. under nitrogen for 90 minutes, the stirring was initiated and the system was brought to 215° C. in another 50 minutes at which temperature distillation of phenol started to occur. When the temperature reached to 265° C. in 40 minutes, nitrogen flow was stopped and the system was brought to a vacuum of 8 mm Hg (1.07 kPa) for 95 minutes. During this period the temperature was raised to 295° C. The reaction was then stopped by flushing the system with nitrogen and cooling. When temperature reached to 260° C., the molten fibrous product was quickly taken out from the kettle under nitrogen flush and then cooled down, yield 119.0 g. Some of the product was checked for Tg and viscosity (it showed Tg 142° C. reduced viscosity 0.76 dL/g). The rest of the sample, after being ground by milling, was put back into the kettle and reheated under vacuum at 0.3 mm Hg (40 kPa) to 215° C. in 55 minutes and to 295° C. in another 50 minutes to distill out extra phenol. The nitrogen flow as then brought in and the material was cooled. When the temperature reached 260° C., the fibrous material was taken out and cooled under nitrogen flow, yield 96.4 g. The polymer showed birefriengence at 173°-350° C. The polymer product was purified by toluene/methanol dissolution/reprecipitation process. Purified polymer had reduced viscosity of 0.97 dL/g (0.5% in 50/50 p-chlorophenol/1,2-dichloroethane) and Tg of 152° C.

EXAMPLE 4

This example illustrates the preparation of a polymer containing mixture of substituted hydroquinones. t-Butylhydroquinone (41.6 g, 0.25 mol), methylhydroquinone (31.0 g, 0.25 mol), diphenyl carbonate (53.6 g, 0.25 mol) and diphenyl terephthalate (79.6 g, 0.25 mol) were charged together with 0.216 g of tetrabutyl titanate to a resin kettle equipped with a nitrogen gas inlet tube, distilling head, mechanical stirrer, and thermometer. After heating to 85° C. under nitrogen for 20 minutes, the stirring was initiated and the temperature was gradually raised to 210° C. in another 60 minutes. At that temperature distillation of phenol started to occur. After 50 minutes the temperature reached 275° C. Vacuum was gradually applied at that time. The pressure reached 0.5 mm Hg (66 Pa) in 10 minutes. The temperature was gradually raised to 300° C. in 15 minutes, after that the temperature was lowered and vacuum was released by flushing with nitrogen. The fibrous polymeric product was quickly taken out when the temperature reached 265° C. The product was then broken up by freezer press and ground in a freezer mill to yield 106.2 g. The polymer showed birefringence from 180° C. to 360° C. under polarizer without shear. The polymer was extracted with boiling toluene for 46 hours and dried at 110° C. for 48 hours. The final product had a reduced viscosity (0.5% in 50/50 p-chlorophenol/1,2-dichloroethane) of 2.95 dL/g and Tg of 135° C.

EXAMPLE 5 t-Butylhydroquinone (83.1 g, 0.50 mol), hydroquinone (55.1 g, 0.50 mol), diphenyl carbonate (107.1 g, 0.50 mol) and diphenyl terephthalate (159.2 g, 0.50 mol) were charged together with 0.432 g of tetrabutyl titanate to a resin kettle equipped with nitrogen gas inlet tube, distilling head, mechanical stirrer and thermometer. After heating to 90° C. under nitrogen for 30 minutes, stirring was initiated. The system was gradually heated to 213° C. in 70 minutes. At that temperature distillation of phenol started to occur. The temperature was then raised to 245° C. in 15 minutes. A vacuum of 4.5 mm Hg (0.60 kPa) was then applied and the system was gradually heated to 288° C. The reaction was then stopped by flushing the system and cooling. The polymeric product, after being cooled down and ground in a mill, yield 191 g. The polymer was infusible up to 360° C.

EXAMPLE 6

This example illustrates preparation of a polymer of exactly the same composition as that of example 4. t-Butylhydroquinone (83.1 g, 0.50 mol), methylhydroquinone (62.1 g, 0.50 mol), diphenyl carbonate (107.1 g, 0.50 mol) and diphenyl terephthalate (159.2 g, 0.50 mol) were charged together with 0.430 g of tetrabutyl titanate to a resin kettle equipped with a nitrogen gas inlet tube, distilling head, mechanical stirrer and thermometer. After heating to 120° C. under nitrogen for 30 minutes, the stirring was initiated. The system was heated to 213° C. in 22 minutes, at which temperature distillation of phenol started to occur. The temperature was kept at 213° C. for 60 minutes and then raised to 235° C. in 15 minutes and stayed there for 20 minutes. Then the temperature was raised to 258° C. in 30 minutes and maintained there for 30 minutes. The temperature was then lowered to 250° C. in 35 minutes and vacuum was applied, it reached 1.2 mm Hg (160 Pa) in 60 seconds. The temperature was gradually lowered to 235° C. in 11 minutes and the vacuum reached 0.7 mm Hg (93 Pa). The temperature was then raised to 258° C. in 4 minutes and then to 290° C. in 18 minutes at a pressure of 1.2 mm Hg (160 Pa). The reaction was stopped by flushing nitrogen into the system and cooling. When the temperature reached 260° C., the yellowish fibrous material was quickly taken out of the kettle under nitrogen flush. The polymeric product was crushed down by a freezer press and ground by a freezer mill. The polymer was then dried in vacuum first at 50° C. for 30 minutes, and finally at 100° C. for 72 hours. The product weighed 192.5 g. The product showed birefringent phenomena from 155° C. under a polarizer. It had a reduced viscosity (0.5% in 50/50 p-chlorophenol/1,2-dichloroethane) of 1.96 dL/g and Tg of 128° C.

The same experiment was repeated once more with exactly same amounts of monomers, same reaction conditions and same treatments afterwards. Yield 194.7 g. The polymer showed birefringent phenomenon from 156° C. under polarizer; it had a reduced viscosity (0.5% in 50/50 p-chlorophenol/1,2-dichloroethane) of 2.02 dL/g and Tg of 130° C.

EXAMPLE 7

This example illustrates another preparation of a polymer of exactly the same composition as that of Example 4. t-Butylhydroquinone (83.1 g, 0.50 mol), methylhydroquinone (62.1 g, 0.50 mol), diphenyl carbonate (107.1 g, 0.50 mol) and diphenyl terephthalate (159.2 g, 0.50 mol) were charged together with 0.432 g of tetrabutyl titanate to a resin kettle equipped with a nitrogen gas inlet tube, distilling head, mechanical stirrer and thermometer. After heating to 130° C. under nitrogen for 30 minutes, the stirring was initiated. The system was heated to 215° C. in 28 minutes, at which temperature distillation of phenol started to occur. The temperature was gradually raised while distilling and reached 268° C. in 129 minutes. Then the reaction mixture was cooled down to 225° C. in 9 minutes and then vacuum was applied, reaching 0.7 mm Hg (93 Pa) in one minute. The temperature was then raised again under this pressure, reaching 240° C. in 19 minutes and 274° C. in 51 minutes. When the temperature reached 280° C. in another 18 minutes, the heating was stopped and the vacuum was released by flushing nitrogen into the system. When the temperature reached 260° C., the yellowish fibrous material was quickly taken out of the kettle under nitrogen flush. The polymeric product was crushed down by a freezer press and ground by a freeze mill. The polymer was then dried in vacuuo at 110° C. for 72 hours and weighed 208.4 g. The product showed birefringent phenomena from 168° C. under a polarizer. It had a reduced viscosity (0.5% in 50/50 p-chlorophenol/1,2-dichloroethane) of 2.72 dL/g and Tg of 132° C.

EXAMPLE 8

The polymer of Example 7 was melt spun on a Brabender Extruder at 220° C. using a 3-hole spinneret (0.020 inch or 0.50 mm diameter) into a quench stack. The yarn was taken up at speeds varying from 40 to 248 feet per minute (12.2 to 75.6 m/min). The as-spun fibers showed tenacities in the general range of 2.83 to 4.03 grams per denier and tensile modulus values of about 150 grams per denier. After heat treatments under nitrogen at 215° C. for 20 hours, it showed tenacities in the general range of 6.03 to 8.24 grams per denier and tensile modulus values of about 182 grams per denier.

EXAMPLES 9 AND 10

Polymers were prepared with 0.5 mols each of methylhydroquinone and t-butylhydroquinone and varying amounts of diphenylterephthalate (0.525 and 0.55 moles, respectively) and diphenylcarbonate (0.475 and 0.45, respectively). It is expected that these two polymers will have higher Tg values and softening temperatures than the polymers of the previous examples.

We claim:
1. In a thermotropic poly(ester carbonate) having diacyl moieties which are primarily terephthalate moi- eties, dihydroxy-derived moieties derived primarily from substituted hydroquinone and carbonate moieties, the improvement wherein the dihydroxy-derived moieties are at least about 40 mol percent t-butyl-benzene-2,5-dioxy, with the remaining substituted benzene-dioxy moieties being substituted by alkyl of 1–6 carbons, alkoxy of 1–6 carbons, phenyl or halo.

2. The thermotropic poly(ester carbonate) of claim 1 being t-butylhydroquinone terephthalate/carbonate.

3. The thermotropic poly(ester carbonte) of claim 1 being t-butylhydroquinone/methylhydroquinone terephthalate/carbonate.

4. The thermotropic poly(ester carbonate) of claim 3 wherein the mol ratio of t-butylterephalate: t-methylterephthalate is between about 1:1 and about 10:1.

5. The thermotropic poly(ester carbonate) of claim 2 or 3 or 4 wherein the mole ratio of terephthalate to carbonate is between about 9:1 and about 1:9.

6. The thermotropic poly(ester carbonate) of claim 5 wherein said mole ratio of terephthalate to carbonate is between about 9:1 and about 1:9.

7. The thermotropic poly(ester carbonate) of claim 1 wherein the mole ratio of diacyl moieties to carbonate moieties is between about 9:1 and about 1:9.

* * * * *